UNITED STATES PATENT OFFICE.

SVEN A:SON BERGLUND, OF STOCKHOLM, SWEDEN.

METHOD OF INCREASING THE CAPACITY OF PHOTOSENSITIVE ELECTRICAL CELLS.

1,289,369.

Specification of Letters Patent.

Patented Dec. 31, 1918.

No Drawing.

Application filed April 24, 1916. Serial No. 93,354.

*To all whom it may concern:*

Be it known that I, SVEN A:SON BERGLUND, a subject of the King of Sweden, and resident of Birger Jarlsgatan 18, Stockholm, Sweden, have invented certain new and useful Improvements in Methods of Increasing the Capacity of Photosensitive Electrical Cells, of which the following is a specification.

The present invention relates to a method of increasing the capacity of doing work of selenium cells or other photo-sensitive cells the electrical conductive power of which is influenced by light. Cells of this kind hitherto known have the disadvantage and inconvenience that under even slight overloads the body of the cell heats up. This generation of heat energy does not only affect unfavorably the operation of the cell and the constancy thereof as an electric conductor or resister, but may under certain circumstances bring the body of the cell to the melting point. This disadvantage has precluded the use of cells of this character for solving problems which cannot be solved without relatively great intensity of currents.

According to the present invention this disadvantage is obviated by an effective cooling of the body of the cells. For carrying out the object of my invention no particular device or arrangement need be resorted to. Any means for effecting a cooling come within the scope of it. As a matter of fact the cooling may be done by manually applying any heat absorbing medium. Heat absorbing and heat exchange devices are so generally known and so commonly used in various arts that I have not deemed it necessary to illustrate a particular device adapted for the purposes of the present invention.

Various media come under consideration for abstracting the heat from cells of the character described as water, air, carbon anhydrid or other substances used for similar purposes in other fields.

The heat absorption or abstraction may be intensified in the well known manner by giving the cell body or its frame a large superficial area exposed to the cooling medium as by channeling or ribbing the body or its frame. The principles governing the heat absorption are, as already stated, old and well understood by persons versed in this art.

It is possible to entirely surround the cell or cells by suitable cooling agents, such as gases or fluids which transmit the light.

I claim:

1. The method of increasing the capacity of photosensitive electrical cells which consists in absorbing heat from the cell while the cell is exposed to light.

2. The method of increasing the capacity of photosensitive cells which consists in surrounding the body of the cell by a heat absorbing medium while the cell is exposed to light.

3. The method of increasing the capacity of photosensitive cells which consists in absorbing, while the cell is exposed to light, the heat generated in the cell as fast as it is generated.

In testimony whereof I have signed my name to this specification in the presence of two subscribing witnesses.

SVEN A:SON BERGLUND.

Witnesses:
T. JOHANSSON,
CLUV. JAH. TIMM.